US008744622B2

(12) United States Patent
Porco

(10) Patent No.: US 8,744,622 B2

(45) Date of Patent: Jun. 3, 2014

(54) INFORMATION MANAGEMENT SYSTEM

(75) Inventor: Elliott Porco, Scarsdale, NY (US)

(73) Assignee: Nova Resolution Industries, Inc., Bronx, NY (US)

(*) Notice: Subject to any disclaimer, the term of this patent is extended or adjusted under 35 U.S.C. 154(b) by 0 days.

(21) Appl. No.: 11/359,812

(22) Filed: Feb. 22, 2006

(65) Prior Publication Data

US 2006/0200271 A1 Sep. 7, 2006

Related U.S. Application Data

(60) Provisional application No. 60/655,049, filed on Feb. 22, 2005, provisional application No. 60/673,162, filed on Apr. 20, 2005.

(51) Int. Cl.
*G06F 17/00* (2006.01)

(52) U.S. Cl.
USPC ............................ 700/244; 700/236; 700/241

(58) Field of Classification Search
USPC .................................. 700/236, 240, 241, 244
See application file for complete search history.

(56) References Cited

U.S. PATENT DOCUMENTS

| | | | | | |
|---|---|---|---|---|---|
| 4,423,319 | A * | 12/1983 | Jacobsen | .................. | 235/472.03 |
| 4,512,453 | A * | 4/1985 | Schuller et al. | ............... | 700/236 |
| 4,735,096 | A * | 4/1988 | Dorr | ............................... | 73/662 |
| 4,845,484 | A * | 7/1989 | Ellsberg | ............................ | 211/4 |
| 4,907,250 | A * | 3/1990 | Ricks | ............................ | 700/236 |
| 5,216,233 | A * | 6/1993 | Main et al. | ............... | 235/462.41 |
| 5,614,892 | A * | 3/1997 | Ward et al. | ............... | 340/870.02 |
| 5,947,326 | A * | 9/1999 | O'Hern et al. | ................ | 220/802 |
| 6,149,062 | A * | 11/2000 | Danielson et al. | ....... | 235/472.01 |
| 7,123,128 | B2 * | 10/2006 | Mullet et al. | ................ | 340/5.71 |

* cited by examiner

*Primary Examiner* — Timothy Waggoner

(74) *Attorney, Agent, or Firm* — Symbus Law Group, LLC; Clifford D. Hyra

(57) ABSTRACT

A system for information management has a compilation device collecting information particular to a vending device located therein, a PDA useable for receipt, manipulation or inputting information into the compilation device. An activation device triggers the compilation device to prepare it to export or import information to or from the PDA. The compilation device has a power source and activation sensor for activation of thereof and in a dormant state prior to such activation, thereby conserving the energy stored within the power source, and allowing the data compilation device to remain as small as possible. The PDA has operating software which is able to synchronize multiple PDAs to a computer server and is also capable of having route management software for use by field engineers.

18 Claims, 9 Drawing Sheets

INFORMATION MANAGEMENT SYSTEM

This application claims the benefit of and incorporates herein by reference the entirety of each of the following U.S. Provisional Patent Applications: (1) 60/655,049, filed Feb. 22, 2005, entitled Data Collection System and Method; and (2) 60/673,162, filed Apr. 20, 2005, entitled Data Collection System and Method

BACKGROUND OF THE INVENTION

The invention relates to the field of information management systems, and more particularly, to an information management system for use with all types of currency-receiving machines in which money is deposited by a consumer and goods or services are dispensed. For example, vending and bulk vending machines, video game machines, pool tables, air hockey tables, laundry mat machines, stamp dispensing machines, child ride on machines, and any and all other types of such machines (such machines and other currency-receiving machines are hereinafter collectively referred to in this specification and the claims hereof as “vending devices”).

Vending devices as described above have been known in the art for many years. Various ways for counting the vends from such vending devices have been pursued during these years as it has always been necessary to monitor the cash received into such devices so as to minimize theft from employees employed to service and collect the money from the devices; i.e., the field engineers. Some examples of such counting mechanisms for such vending devices can be found in U.S. Pat. Nos. 6,290,049; 6,062,370; 6,050,385; 5,950,794; and 5,909,795. The disclosures of all of these patents are incorporated herein by reference in their entireties, as they are to be used herein as enabling embodiments of the data compilation device of this application. Examples of other counting mechanisms for such vending devices can also be found in U.S. Pat. Nos. 5,201,396; 4,392,564; 4,376,479; 4,369,442; 4,216,461; 4,143,749; and 3,783,986.

Accordingly, while up to now it has been possible to count vends in such vending devices and thereby monitor the collection efforts of a vending operator’s field engineers, no automated system exists to easily collect, manipulate and selectively review this important information. Such information being important to the stores/locations where the vending devices are located and where the consumers interact with the devices, the vending device operators who are responsible for maintaining the vending devices in both the mechanical and product availability capacity, as well as in a money collection capacity, the original equipment manufacturers (hereinafter in the speciation and the claims abbreviated as “OEM”) who are the manufacturers of the vending devices and are interested in which devices are attracting the most business, the mechanical integrity and “up-time” of the OEM’s particular vending devices, as well as what products/services are most sought after by the consuming public so that changes can be made to types of products/services being dispensed at particular locations, and the supplier of the products dispensed from such vending devices, who are interested, as the vending device operators are interested, in the types of products that are selling best and which products are doing best in which locations. It is thus seen that there are innumerable pieces of information which the seemingly innocuous vending devices described hereinabove can provide to various users of the information in order for these users to better manage the traffic to and from the devices so as to maximize the devices’ up-time and revenue generation.

Accordingly, it would be desirable to provide an information management system for such vending devices that is compact, has transportable components that are small, powerful and easily manipulated and used, communicable with other devices, such as a central computer server for compiling and manipulating the information from the vending devices, and which makes this multitude of information accessible, viewable and able to be manipulated by various groups of individuals having interests in the information. It would also be desirable to permit easy connection of users to the system, as by wireless connection or a quick connect/disconnect provision.

SUMMARY OF THE INVENTION

In accordance with the invention, an information management system for vending devices is provided.

The system comprises a data compilation device located substantially within a vending device for collection of information particular to the vending device, a personal digital assistant, sometimes also referred to as a “personal data assistant”, (hereinafter referenced to in this specification and the claims as “PDA”) to be used by a user of the data compilation device for either or both of, receipt and manipulation of the information and/or inputting at least some of the information into the data compilation device and an activation device operating between the data compilation device and the PDA for triggering the data compilation device so that the data compilation device knows to be ready to export the information, or at least a part of the information, or is ready to import at least some of the information, to or from the PDA. The data compilation device having a power source and activation sensor for activation of the data compilation device. The data compilation device being in a dormant state prior to such activation time, thereby conserving the energy stored within the power source, and allowing the data compilation device to remain as small as possible; i.e., if the power source is a battery, or batteries, of the type known to exist, the smallest such batteries may be used and their power conserved for the longest possible time due to the existence of the activation device and the activation sensor. The PDA having operating software, and that operating software being able to synchronize multiple PDAs to a computer server and being capable of having route management software for use by field engineers. Contemplated technologies for communication and synchronization include, but are not limited to, a type of cradle for the PDA known in the art as an ActiveSync cradle, Dial-up VPN (virtual private network, and Broadband VPN (e.g. Internet).

While it is best for the components of the system to wirelessly communicate by using the various wireless communication technology known to exist (such as, but not limited to, Blue Tooth, infrared, wifi, radio frequency, RFID, GPRS and cellular, and others that are known to exist and or may exist in the future), the system nevertheless also anticipates a hard-wired connection. So, for example, the data compilation device cannot only have a digital readout for the number of vends counted, which digital readout can be read by the field engineer and manually inputted into the field engineer’s PDA, it is to be understood that this information is also capable of being stored in a storage device such as a computer chip located in the data compilation device. Such a storage device can be hardwire connected or wirelessly connected to the counting element, and the information stored in the storage device can be communicated to the field engineer’s PDA wirelessly and/or via methods such as socket plug connections and/or bar coding. In addition, the information stored in the PDA can then be downloaded either by a hardwire connection or wireless transmission to the central computer server(s). In addition, communication between the data compilation device and the activation device can be a bar coding communication or a socket/plug communication or a wireless communication.

It is therefore an object of the invention to provide an improved information management system for vending devices. It is specifically contemplated that collection accountability should be tamper proof.

Still another object of the invention is to provide and improve information management for vending devices having an activation device to maintain security of the information compiled in the data compilation device and to provide for a longer shelf life of the power source of the data compilation device.

Yet a further object of the invention is to provide an improved information management system for vending devices in which the elements of the system can communication with each other through various forms of hardwired and/or wireless communications.

Still a further object of the invention is to provide an improved information management system for vending devices wherein the central computer server to which the information is ultimately compiled, stored and secured is divided into various allowable user groupings, which allowable user groupings designate a different hierarchal user or set of users able to access and/or manipulate the information.

Other objects of the invention will in part be obvious and will in part be apparent from the foregoing description.

The invention accordingly comprises assemblies possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
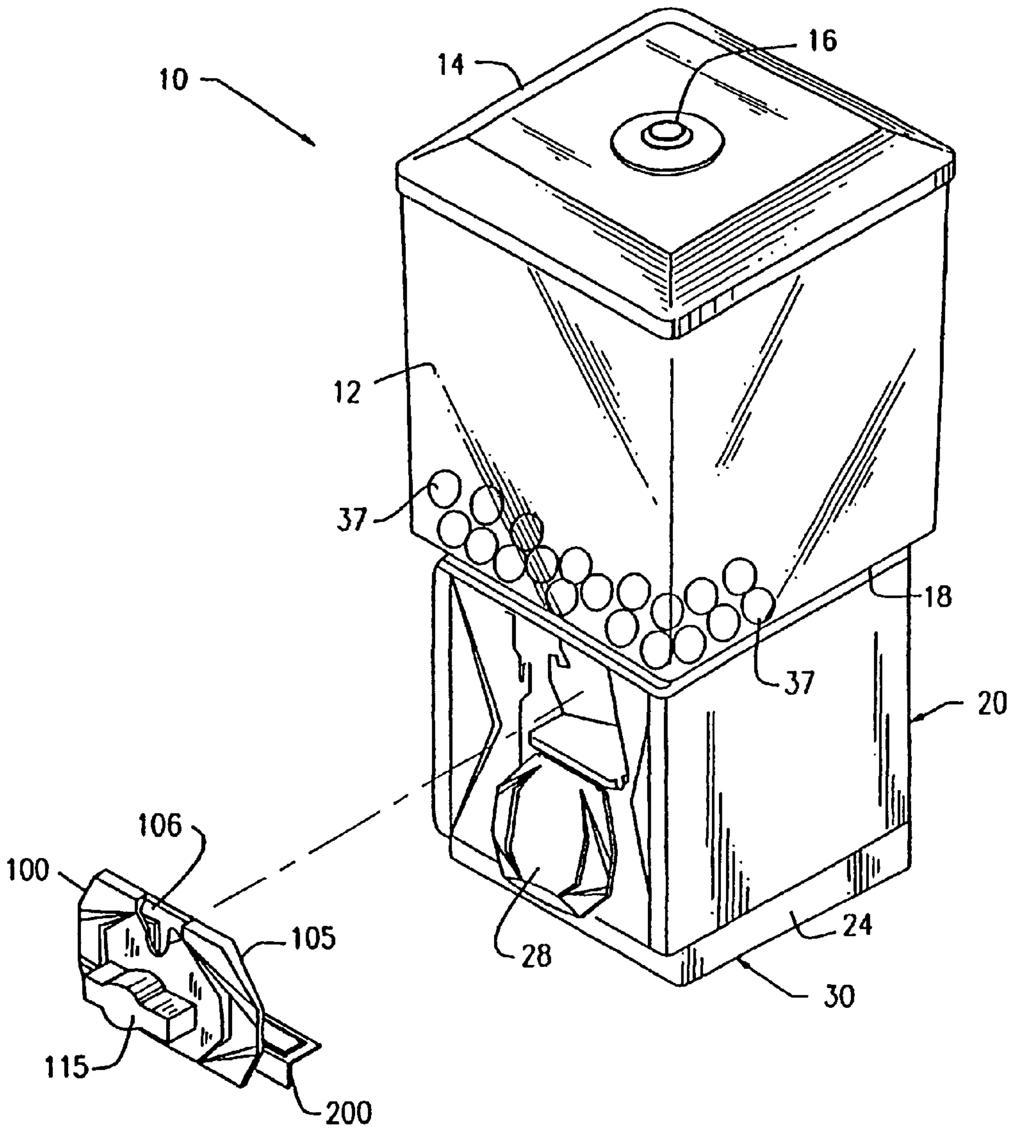
FIG. 1 is a perspective view of a vending device, in particular and for an exemplary embodiment, a bulk vending machine having an exploded view of a placement of a coin mechanism and a data compilation device anticipated by the subject invention.
Figure 2:
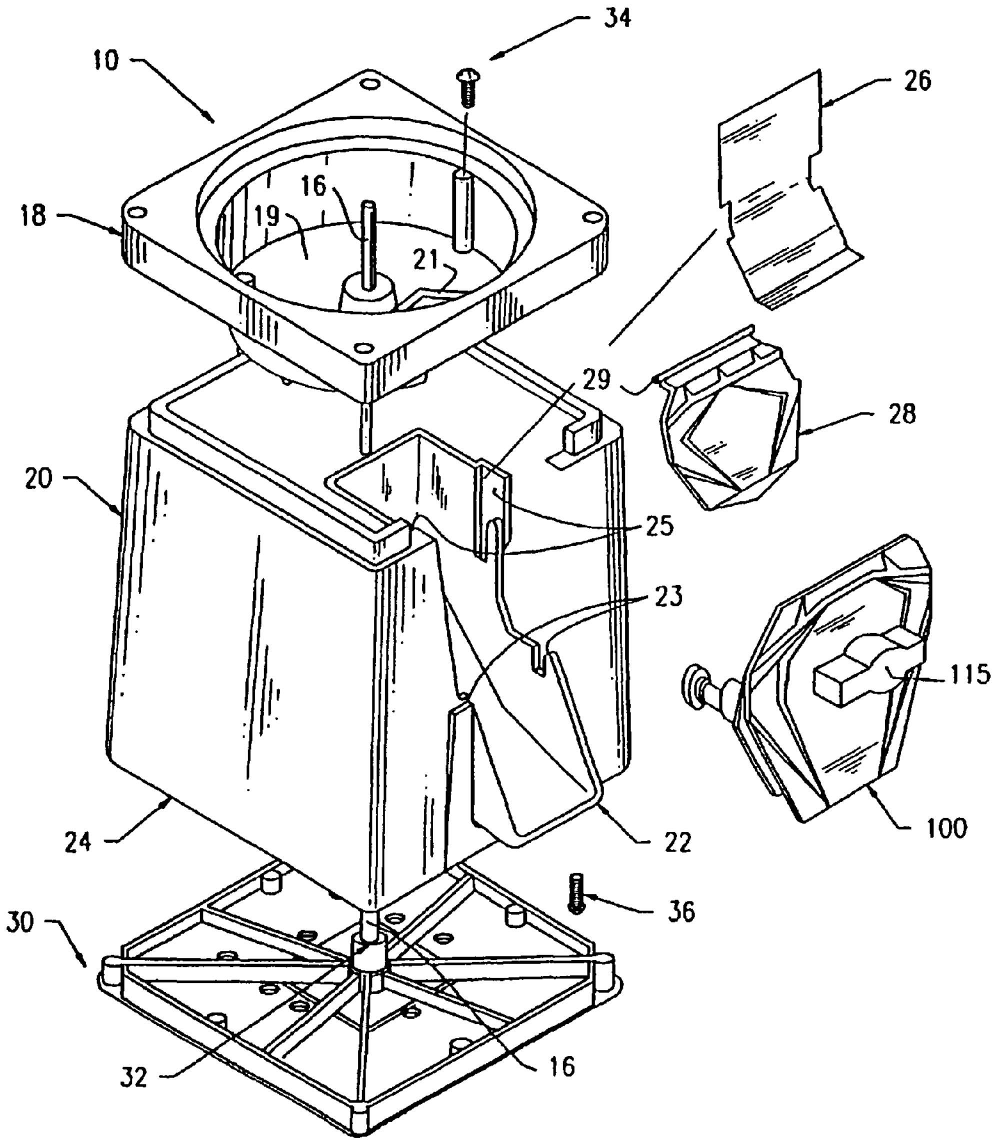
FIG. 2 is an exploded perspective view of a second embodiment of an exemplary bulk vending machine.

Referring first to FIGS. 1 and 2, two different, although very similar looking and functioning vending devices are shown at 10. For purposes of this application vending devices 10 are shown as bulk vending machines. In addition, and for purposes of this application, the bulk vending machines of FIGS. 1 and 2, will be considered equivalent. It is further to be understood, as has been previously stated hereinabove, that any and all types of vending devices are anticipated and covered herein, including but not limited to, vending machines, bulk vending machines, video game machines, stamp dispensing machines, laundry mat machines, pool tables, air hockey tables and child ride on machines (as found at amusement parks and/or shopping malls). Continuing with FIGS. 1 and 2, preferred embodiments of vending devices 10 are shown having a top bulk receptacle 12 having a lid 14 and a bolt 16. The base of both machines 10 have a hopper 18, a body 20, a dispensing chute 22, a coin retainer base 24, a chute shield 26, a chute cover 28 and a coin mechanism 100.

In general, device 10 has a base 30 into which bolt 16 extends to be secured by nut 32. Receptacle 12 is held to hopper 18 by screws 34. Coin retainer 24 is held to the bottom of base 20 by screws 36. Chute shield 26 is secured onto chute 22 in notches 25, while chute cover 28 is rotatingly secured to chute 22 by rod 29 of cover 28 resting within notches 23 of chute 22.

Hopper 18 has a base 19 into which dispensing materials (for example, gum balls 37, see FIG. 1) are placed. Hopper 18 has an opening 21 extending through base 19. Opening 21 is the passageway through which gum balls 37 pass to exit device 10 through chute 22. As will be discussed in more detail below with regard to FIG. 3, coin mechanism 100 has a sprocket 150, which when rotated due to a user of device 10 turning handle 115 of coin mechanism 100, causes a product wheel (not shown) to rotate. The product wheel has at least one opening which for each rotation of handle 115 corresponds with opening 21 of hopper 18, to allow for dispensing of one gum ball 37, or multiple quantities of such items as nuts, trail mix, M&Ms, etc.

Figure 3:
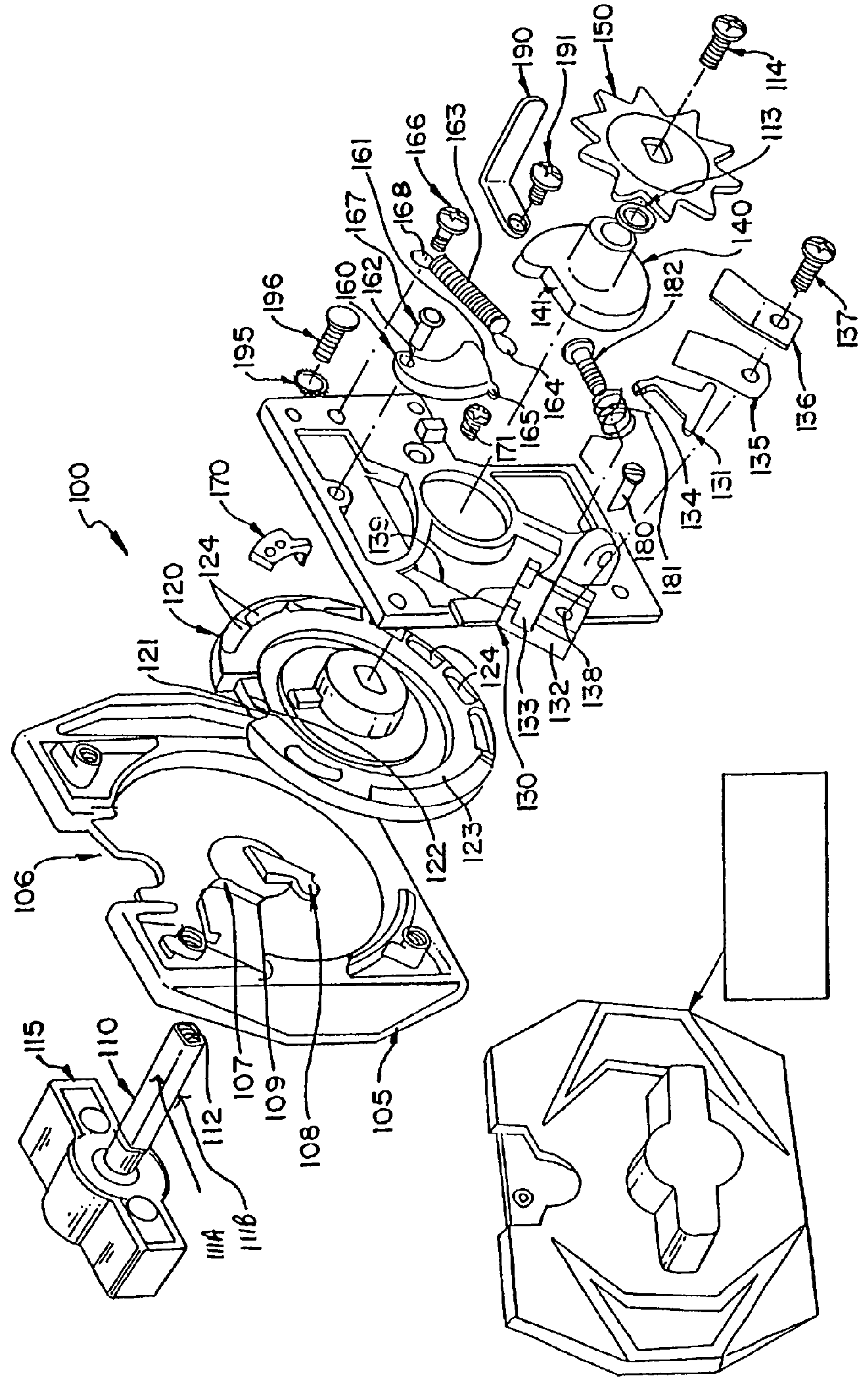
FIG. 3 is an exploded perspective view of the workings of an exemplary bulk vending machine coin mechanism.

Turning now to FIG. 3, an exploded view of a standard coin mechanism for a bulk vending machine is shown at 100. It is to be understood that the use of differently constructed coin mechanisms is also anticipated herein. Coin mechanism 100 has a front plate 105, shaft 110, handle 115, coin wheel 120, back plate 130, cam 140 and sprocket 150. Shaft 110 is axially located through all of the stated elements, and secures said elements together through use of threads 112 in shaft 110 and washer 113 and nut 114. Shaft 110 is also usually shaped in cross-section having at least one flat edge 111, with the rest being circular in cross-section, while the one of FIG. 3 actually has two such flat edges 111A and 111B. At the end of shaft 110, opposite threads 112, is handle 115. As seen earlier in FIGS. 1 and 2, handle 115 is one of the few parts of coin mechanism 100 which is exterior to bulk vending machine 10, and is the part that a user of bulk vending machine 10 uses after insertion of coins to receive his/her treat.

Continuing with FIGS. 1 and 3, front plate 105 of coin mechanism 100 has a coin receiving slot 106. In use, a user of device 10 inserts a coin, or coins (usually quarters) into slot 106 of front plate 105. For purposes of this disclosure the coinage used will be assumed to be singular; i.e., one quarter. Once the coin is inserted through slot 106, it comes to rest within slot 121 of coin wheel 120 (see FIG. 3), where it sits upon curved ridge 122. In its position on curved ridge 122, a quarter will turn with coin wheel 120 when handle 115 is rotated.

In operation, coin mechanism 100 preferably operates as follows:

1. As previously discussed, a coin is placed within slot 106 of front plate 105, to rest upon curved ridge 122 of slot 121 of coin wheel 120.

2. Handle 115 is rotated, usually in a clockwise direction, where the coin undergoes its first test of authenticity. The coin first comes into contact with coin pawl spring 107 and coin pawl 108. As coin wheel 120 is rotated, the coin pushes end 109 of coin pawl spring 107 upward. Assuming the coin has a proper diameter, end 109 of coin pawl spring 107 will sufficiently rise, thereby disengaging coin pawl 108 from locking coin wheel 120 in position. Coin wheel 120 will thereafter be free to continue its rotation.

3. The coin next encounters washer pawl 131, which is secured within washer pawl mount 132, having a receiving notch 133.

Washer pawl 131 is held within slot 133 of mount 132 by washer pawl spring 135, washer pawl retainer 136 and washer pawl retainer screw 137. Washer pawl retainer screw 137 screws into mount 132 at threaded opening 138. When secured in place, washer pawl 131 has its end 134 extending through opening 139 of back plate 130. While coin pawl 108 was responsible for authenticating the diameter of the coin, washer pawl 131 is the item which authenticates the thickness of the coin.

In operation, end 134 of washer pawl 131 runs against inside surface 123 of coin wheel 120. As can be seen at slot 121, with no coin in coin mechanism 100 (if for some reason coin wheel 120 somehow turned passed coin pawl 108), coin wheel 120 would be prevented from turning further due to end 134 of washer pawl 131 entering into slot 121 of coin wheel 120. In this position, slot 121 would hit against end 134, causing coin wheel 120 to halt in its rotation. Similarly, if the thickness of the coin was too thin, end 134 would slide off of surface 123 down to the surface of the coin, and would again touch part of slot 121, preventing further rotation of coin wheel 120. In contrast, if the coin were too thick, end 134 of washer pawl 131 would hit into the edge of the coin, and coin wheel 120 would at that point be prevented from rotating further. Only when the coin is of the proper thickness, will end 134 run smoothly between surface 123 and the surface of the coin, thereby allowing coin wheel 120 to continue its rotation.

4. The final pawl of coin mechanism 100 is return pawl 160. Return pawl 160 has a bottom side 161 and a substantially curved side 162. When cam 140 is in its resting position (between uses), it is the position shown in FIG. 3. In this position, surface 161 of return pawl 160 rests upon flat surface 141 of cam 140.

Figure 8:
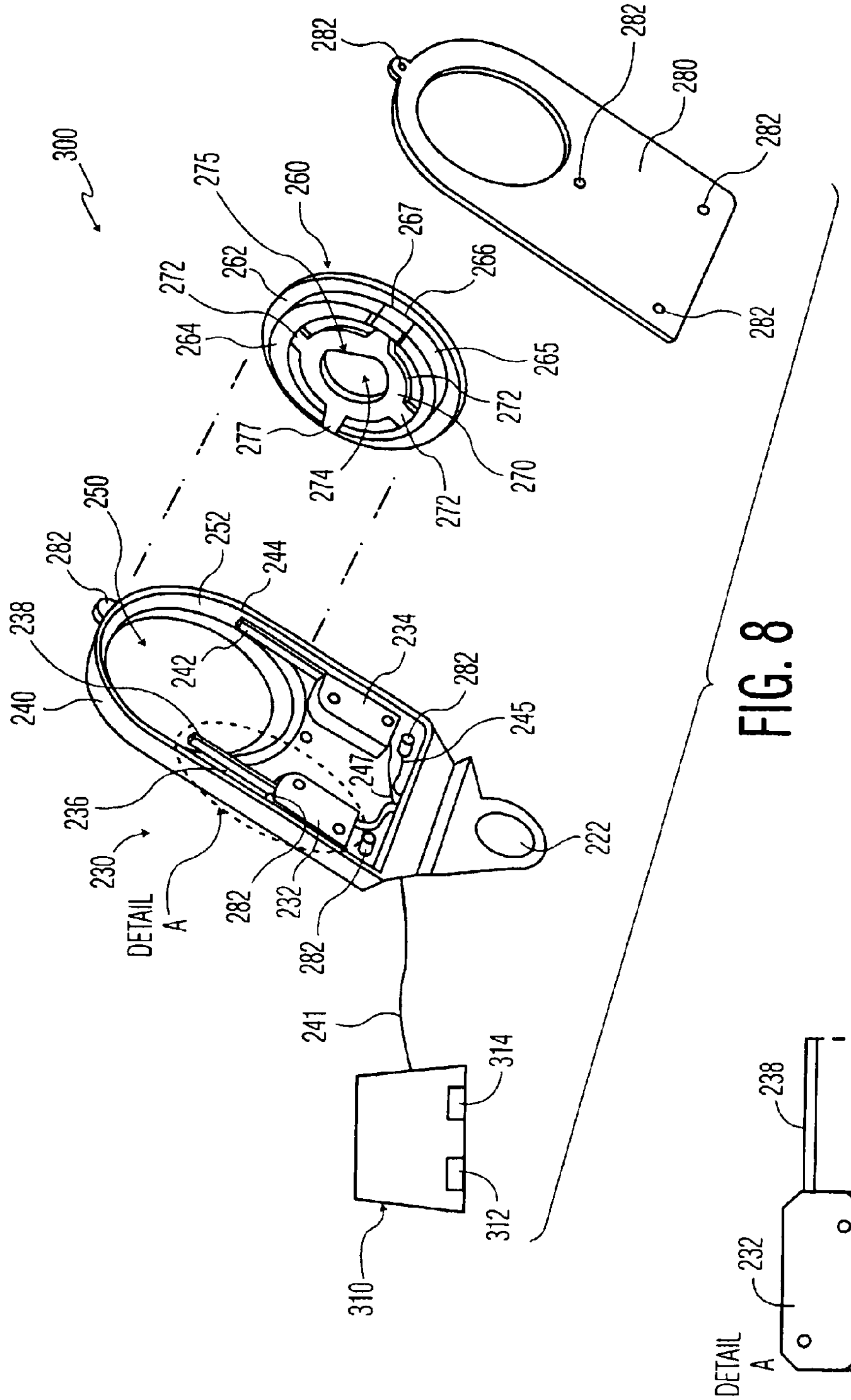
FIG. 8 is an exploded perspective view of another exemplary embodiment of a data compilation device.
Figure 8A:
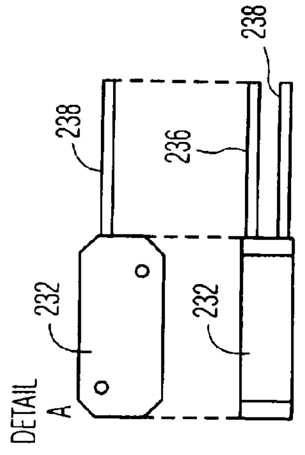

Return pawl 160 is pulled into its at rest position shown in FIG. 3 by spring 163 having first and second loops 164 and 165. Loop 164 is received around protrusion 165 of return pawl 160, and spring 163 is secured to back plate 130 by screw 166. Accordingly, tension from spring 163 maintains return pawl 160 in its at rest position, as shown in FIG. 8.

Return pawl 160 is riveted into back plate 130 by return pawl rivet 167, to enable return pawl 160 to pivot.

5. Attached at the end of shaft 110, between cam 140 and bolt 114, is sprocket 150, which as previously discussed, turns the product wheel (not shown) which allows for the dropping of treats, such as gum balls 37, from receptacle 12 of bulk vending machine 10 into chute 22 for receipt by a user of device 10.

6. Continuing with the progress of the coin as coin wheel 120 rotates, after the coin passes washer pawl 131, coin wheel 120 is easily turned until slot 121 is in its starting position aligned with slot 106. It is in this position where return pawl 160 and cam 140 are in their at rest position, as previously discussed.

However, prior to coin wheel 120 being returned to its starting point, the coin is deflected by coin kickout 170 out from slot 121 and into coin retainer 24. Coin kickout 170 is secured to back plate 130 through use of screw 171.

Some final notes regarding the structure of coin mechanism 100, as shown in FIG. 3. First, coin wheel 120 has a plurality of notches 124 into which stroke pin 180 are received. The purpose of notches 124 and stroke pin 180 is to prevent coin wheel 120 from being turned counter-clockwise, so that the user can retrieve his/her coin. In particular, you will note that the bottom surfaces of notches 124 are slanted. Accordingly, it is obvious that stroke pin 180 will slide out from notches 124 along the bottoms of notches 124, from one notch to the next as coin wheel 120 is rotated in a clockwise direction. However, it is equally obvious that stroke pin 180 will hit against the ridges of notches 124, should the user attempt to rotate coin wheel 120 in a counter-clockwise direction. Stroke pin 180 is held in place through a slot (not shown) in back plate 130 by a spring 181 and screw 182.

Next regarding FIG. 3, coin mechanism 100 is retained within body 20 of device 10 by use of latch 190, which is secured to back plate 130 by a screw 191. Latch 190 is selectively rotatable from its locked position (shown in FIG. 3) to an unlocked position, 90° from the position shown in FIG. 3. Finally for FIG. 3, front plate 105 and back plate 130 are secured together through use of washers and bolts 195 and 196.

Figure 4:
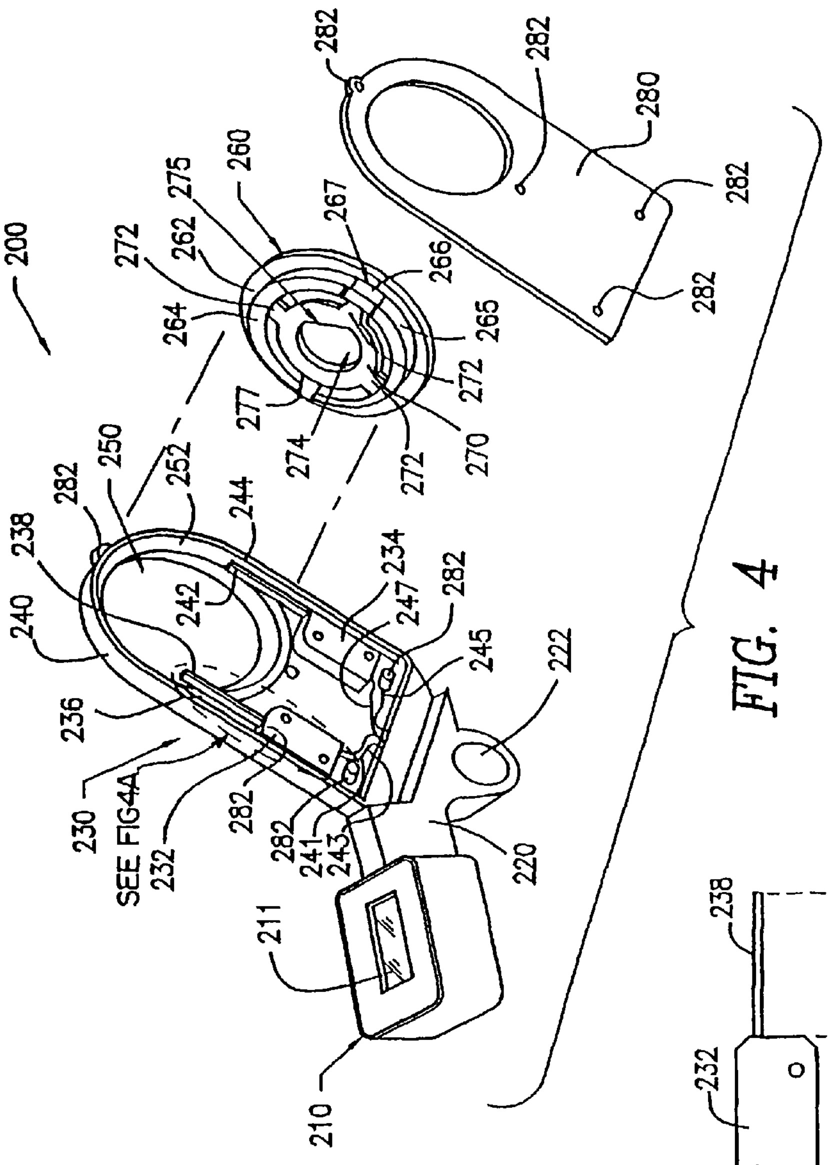
FIG. 4 is an exploded perspective view of an exemplary data compilation device.
Figure 4A:
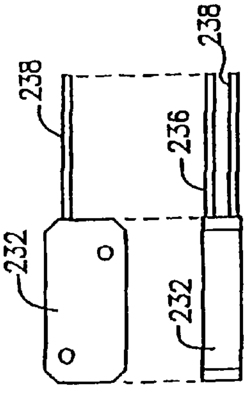
Figure 5:
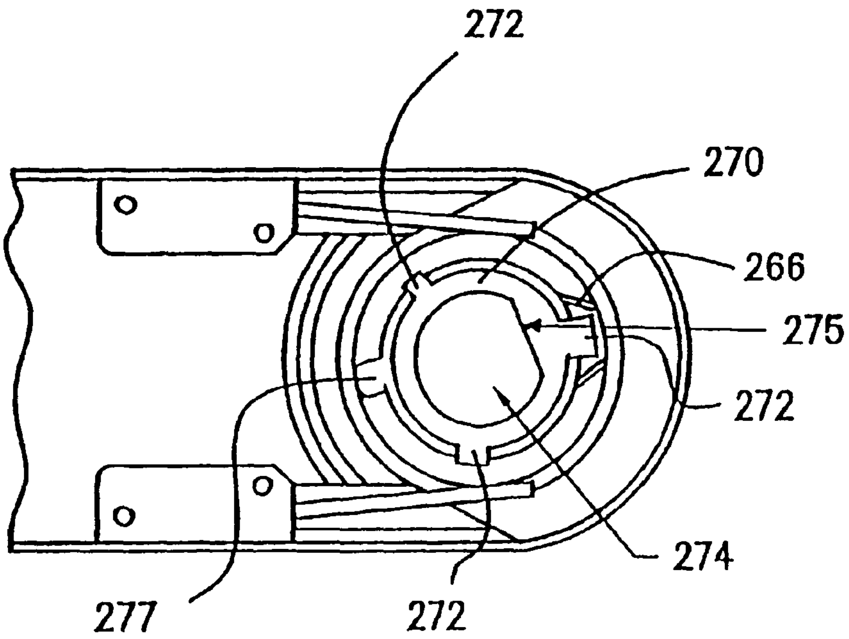
FIG. 5 is a top plan view of a contact switch mechanism for an exemplary data compilation device.
Figure 6:
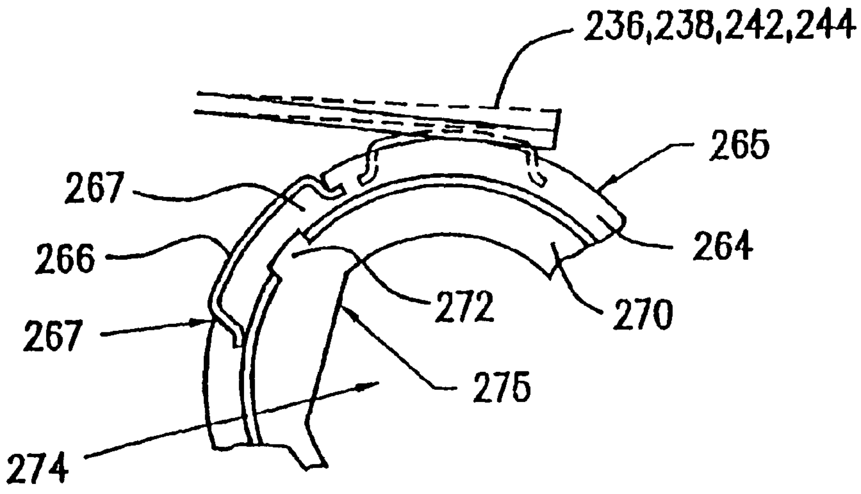
FIG. 6 is a close-up top plan view of contact being made in the switch mechanism of FIG. 5.

Turning now to a discussion of data compilation device 200 (as seen in FIGS. 4-6), and to how data compilation device 200 operates in relation to coin mechanism 100. Data compilation device 200 has a numeric display 210, preferably having an LCD display 211, a bracket assembly 220 and a switch 230. Display 210 is mounted on bracket 220, as is switch 230. Switch 230 is connected to display 211 through at least one lead (not shown), which at least one lead is held within bracket assembly 220.

Bracket 220 is specially designed and configured to fit onto coin mechanism 100, on back plate 130, without interfering or in any way hindering the standard operation of coin mechanism 100. In fact, as will be discussed immediately below, bracket 220, and therefore data compilation device 200, are so designed as to allow switch 230 to interact with shaft 110, and its flat edge(s) 111, during normal rotation of shaft 110 and the normal operation of coin mechanism 100.

Bracket 220 is attached to plate 130 of mechanism 100 through use of one of the screws used to make mechanism 100; screws 137, 166, 191 or 196. Since there are many different coin mechanisms used in the bulk vending industry today, it is anticipated by the invention that any such existing screws of the mechanism can be used to connect data compilation device 200 with the mechanism. It is also anticipated, although less desirable, to add a new screw to the mechanism to attach data compilation device 200 to the mechanism. Whichever screw is used, it is inserted through chamber 222 of bracket 220.

As seen in FIG. 4, switch 230 has a main body portion 240, a rotating contact portion 260 and a cover 280. Most of body 240, rotating contact portion 260 and cover 280 are made from extruded or molded plastic, which is strong, cheap to produce, able to be molded/extruded into any shape and light weight; such plastic also does not interfere with the manner of functioning of the data compilation device, as will be discussed below. Cover 280 is attached to body 240 through use of three screws (not shown) insert through screw holes 282. It is of course anticipated that any number of screws can be used to attach cover 280 to body 240.

Directing attention now to the inner workings of body 240 of switch 230, the data compilation device is seen to have two contact switches 232 and 234. Contact switch 232 has two wire contacts extending therefrom, wires 236 and 238. Similarly, contact switch 234 has two wire contacts extending therefrom, wires 242 and 244.

Contact switch 232 of switch 230, has leads 241 and 243 extending therefrom, which leads are the electrical connections between switch 232 and a capacitor (not shown) and display 210. Contact switch 234 also has at least one lead 245 extending therefrom, and possibly a second lead 247, for discharging of the capacitor.

Body 240, proximate to and substantially around contact switches 232 and 234, has a lipped opening 250. Opening 250 has a ledge 252 for rotating receipt thereon of outer flange element 262 of rotating contact portion 260.

Rotating contact portion 260 is substantially circular in shape, has an outer flange element 262 which is matingly received within opening 250 of body 260, so that flange 262 is rotatingly received onto ledge 252. Extending away from flange 262 is an annular ridge 264. An outside wall 265 of ridge 264 is substantially in contact with all of wires 236, 238, 242 and 244 of contact switches 232 and 234, when rotating contact portion 260 rotates. Accordingly, these wires essentially ride along this wall when portion 260 rotates.

As is best seen in FIG. 6, located on and within ridge 264 is a gap 267 in wall 265. Within gap 267 is a metal strip 266. Metal strip 266 has a width at least equivalent to the thicknesses of the wire combinations of wires 236/238 and 242/244, and the distance between these wire combinations. Accordingly, when rotating contact portion 260 rotates in its usually counterclockwise direction (since handle 115 of coin mechanism 100 usually rotates in a clockwise direction), metal strip 266 will at certain intervals touch both of wire combinations 236/238 and/or 242/244; these contacts taking place at different intervals.

When metal strip 266 touches wire combination 236/238, it closes contact between these normally separated wires, thereby causing data compilation device 200 to increase one increment or numeral, which is shown on display 210. At the same time as data compilation device 200 increases one increment/numeral, a capacitor (not shown) of the assembly becomes fully charged. It is only after rotating contact portion 260 rotates further so that metal strip 266 then touches wire combination 242/244 will the capacitor be discharged, and thereby allowing the data compilation device to have the ability of achieving another count. Since wire combinations 236/238 and 242/244 are spaced apart, and since the system's capacitor becomes fully charged after wires 236/238 are contacted by metal strip 266, even if handle 115 is roughly jiggled and/or turned back and forth by a user so that metal strip 266 repeatedly leaves and then re-touches wires 236/238, only one count will be registered by data compilation device 200. In addition, and what also helps this double-count protection work, is that coin mechanisms 100 usually are constructed so that after handle 115 turns a certain distance, it cannot go back. Accordingly, if wire combinations 236/238 and 242/244 are separated and placed into two different turning zones of handle 115, then after discharge of the capacitor (which discharge allows data compilation device 200 to make another count), metal strip 266 would not be able to go back and re-touch wire combination 236/238 to cause a double count. The only place for handle 115 and metal strip 266 to go is back to the beginning position of coin mechanism 100, where it is then ready to receive another coin and start the process over again.

Addressing another embodiment of data compilation device 200, we turn attention to data compilation device 300 of FIG. 8. As can be seen, data compilation device 300 is substantially identical in construction to data compilation device 200, specifically switch 230 and body 240, but without display 210. Replacing display 210 is data storage device 310. The data storage of device 310 is achieved through standard, known manners of doing the same; as for example, a computer chip having memory for receiving the information from data compilation device 300. As will be explained in more detail below, this stored information, or parts thereof, will then be able to be transferred to a PDA operated by a field engineer working for device 10's vendor/operator, and thereafter further manipulated and compiled, as disclosed herein.

Device 310 will also be able to provide other data relevant to device 10, such as, but not limited to, day and/or time of particular vends, the identity of the particular machine from which the vend took place, the particular location/owner/operator of the particular machine from which each vend originated, the particular product dispensed from the particular machine, the field engineer's identification information, day and/or time of the field engineer's attendance of the machine, whether a service ticket exists, the commission percentage of the vended product, the amount received for each vend and allow for multiple hook-up of such devices from numerous machines found at one location so as to achieve a report on all vends of a particular location.

All of the information available from device 310 will be transferable to PDA 500 (see FIGS. 9 and 10, and the below discussions pertinent thereto) through output port 312. Such data transfer through port 312 can be either a hardwired connection to PDA 500, or a wireless transfer. If hardwired, the transfer would be by bar code information transfer and or actually plugging a wire from the PDA into a socket port 312. If wireless, the transfer can be via any of the known manners of such communications, including but not limited to, Blue Tooth, infrared, wifi, radio frequency, RFID, GPRS or cellular, or others which become known in the future.

Device 310 also has input port 314, through which the person setting up the field engineer responsible for setting up vending device 10 can input data relevant to the particular location/owner, vendor/operator, product to be dispensed, number of units of product per purchase, field engineer attending to the machine, and other similar information. Presumably, such inputted information would also be in whole or in part transferred with the rest of the data, so as to make any report issued therefrom as complete as possible.

It is also to be understood from the invention that device 310 is not necessarily an integrally attached component of data compilation device 300, located within opening 21 of device 10. In the alternative, device 310 may be connected remotely, by long lead wires 241, or possibly even through the same type of communications transmissions discussed above relating to wireless transfer of the information to the PDA. Part of the determination of the location of device 310 will depend upon the vendor/operator and how he/she/it will want to access output and input ports 312 and 314. For example, if the above discussed hardwired connections to PDA 500 are desired then ports 312 and 314 will need to be accessible from the outside of device 10.

Since data compilation device 300 is unchanged in how it interacts with mechanism 100 to achieve counts/generate information, the below discussion regarding data compilation device 200's operation relevant to mechanism 100, is similar to how data compilation device 300 would so operate.

To further explain the operation of data compilation device 200 with mechanism 100, it must be understood that data compilation device 200 is attached onto coin mechanism 100 in such a way that opening 250 of body 240 is received around shaft 110 of mechanism 100. Body 240 is positioned between either cam 140 and washer 113 of mechanism 100, or between washer 113 and sprocket 150 of mechanism 100. Due to the earlier discussed shape of shaft 110, having one or two flat edge(s) 111A and/or 111B, the rotation of shaft 110 causes rotating portion 260 (closed within and between body 240 and cover 280), to also rotate. This is because (as shown in FIGS. 4-6), rotating portion 260 has a key 270 attached thereto.

Key 270 is attached to ridge 264 by legs 272, which preferably fit within receiving slots in ridge 264. Through the center of rotating portion 260 and key 270 is keyed opening 274. Keyed opening 274 is substantially circular in shape, but having one flat edge 275. It is flat edge 275 which interacts with flat edge 111 (111A or 111B) of shaft 110, and thereby locks the rotation of portion 260 into synchrony with shaft 110 (and therefore handle 115).

Legs 272 of key 270 can have a length which extends opening 274 and edge 275 away from the main body of portion 260 and body 240 of switch 230. The purpose of this versatility in length of legs 272 is to allow data compilation device 200 to be adapted to fit onto the many varied sized and shaped coin mechanisms 100 used in the industry.

Further, as seen in FIGS. 4 and 5, a second keyed opening exists in portion 260. This second keyed opening is opening 277, located not in key 270, but in ridge 264. Opening 277 is used on some coin mechanisms instead of key 270 (although this does not necessarily mean that key 270 must be removed from portion 260). In particular, some coin mechanisms do not use a shaft having a flat surface, but instead having a protruding nipple at and near the end of the shaft, in and around the cam/sprocket portion of the mechanism. Device 10 has been adopted to be usable with these types of mechanisms and make use of these nipples by incorporation of opening 277.

Figure 7:
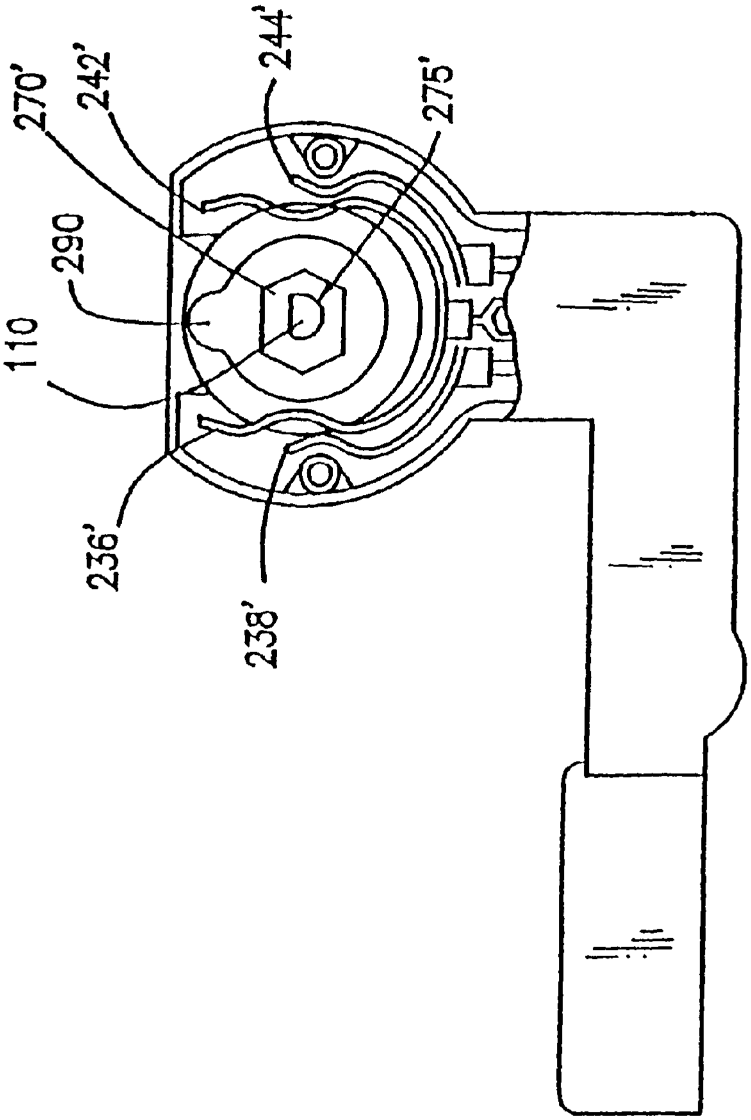
FIG. 7 is a top plan view of another exemplary embodiment of a switch mechanism of an exemplary data compilation device.

Attention is next turned to the embodiment of FIG. 7. This embodiment substitutes the construction shown for that of FIGS. 4-6. In particular, a cam 290 is used to push wire 236' into wire 238', causing the counting and charging of the capacitor. Thereafter, cam 290 rotates and pushes wire 242' into wire 244', causing the capacitor to discharge. The rotation is allowed by shaft 110 and keyed opening 275' of key 270'. This embodiment can also have the opening 277 of the prior embodiment.

As seen in the figures, the coin mechanism 100 and data compilation device 200 combination are substantially equivalent in size to the coin mechanism 100 by itself. In this way, data compilation device 200 is able to be used within all bulk vending machines, in the limited space provided within body 20, between chute shield 26 and rear plate 130.

In a preferred embodiment, data compilation device 200 is self-powered by, preferably, a nickel cadmium battery, and therefore there is no need to position vending device 10 near an AC power outlet for purposes of running device 10. The lack of an AC power hook-up to power data compilation device 200 also increases the safety of the apparatus, since there is no possibility of electric shock to the users of the bulk vending machines. As will also be discussed below, activation device 600 helps to preserve the life of the data compilation device's power source Data compilation device 200 is also positioned and oriented so as to be easily readable during normal collection procedures for bulk vending machines.

It is to be understood, as has been earlier stated herein, that the embodiments of the data compilation device shown in FIGS. 1-8 are representative only, and not meant to be viewed in a limiting sense. In particular, any other type of data collection unit that can be employed in a vending device is capable of functioning within the information management system of the subject invention.

Figure 9:
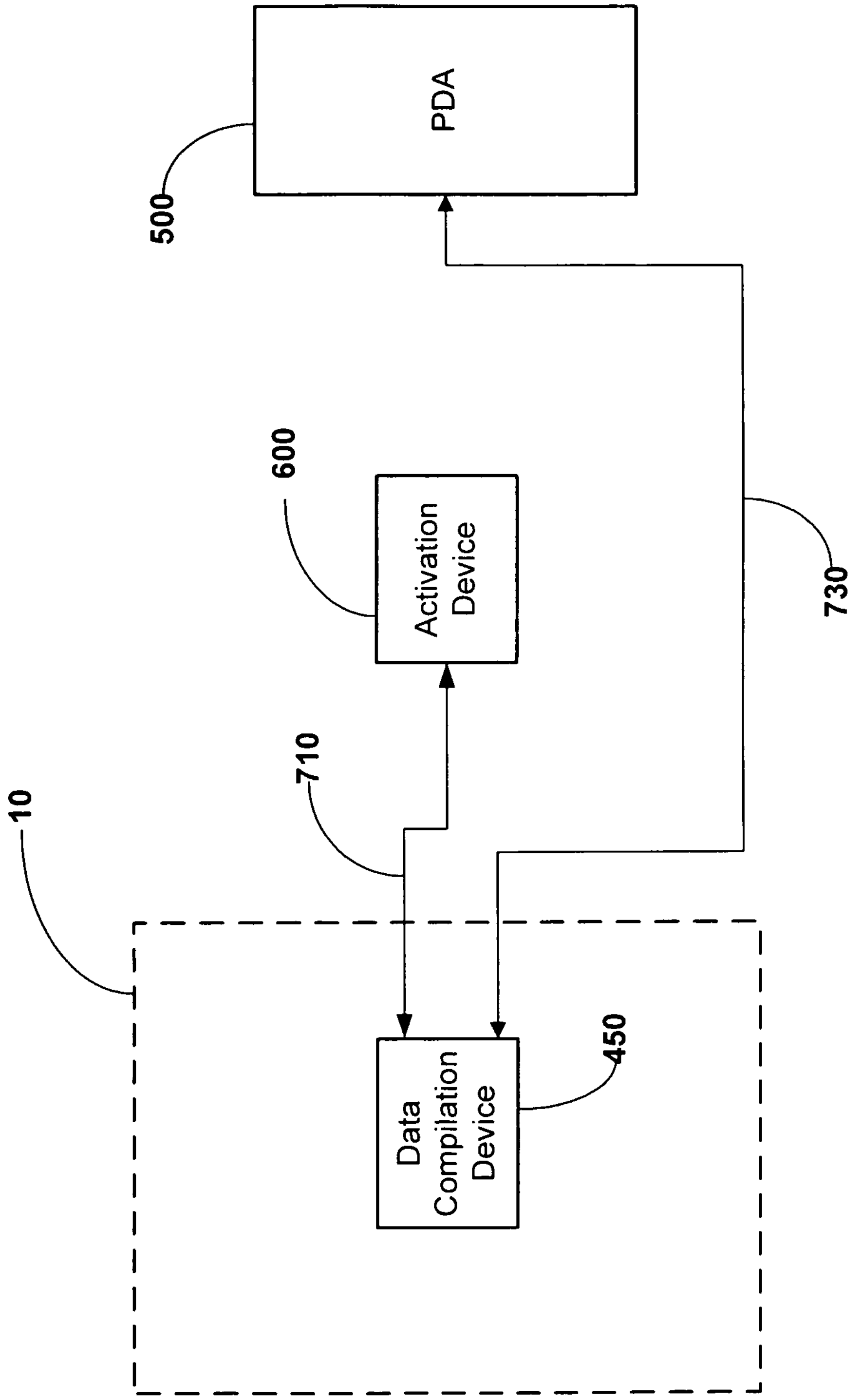
FIG. 9 is a block diagram of the system of the invention.

Turning now to a discussion of FIG. 9, a block diagram of and embodiment of and information management system 400 which is to be disposed at least in part within a vending machine. Information management system 400 comprises data compilation device 450, exemplary examples of which have been earlier described herein at data compilation devices 200 and 300, activation device 600 and a communication connection (730) for a PDA 500. Communication between the three devices are shown at 710, 720 and 730, and include hardwired and/or wireless communication between data compilation device 450 and activation device 600 at 710 and between data compilation device 450 and PDA 500 at 730. Communication 730 may also be either hardwired or wireless. It is preferred that a compilation device not be specific to any activation device, but rather that any activation device work for an authorized user, like a field engineer. Thus, where activation devices include a time-out feature, it would be preferred to have prorated termination dates, so that an activation devices purchased at different times could be renewed at the same time.

PDA 500 may be any type of commercially available PDA. The two most popular types of PDAs today employ either the Palm Pilot operating system of a variant of Microsoft Windows. A wide range such PDAs are available today, including ones in the form of cell telephones. These will be familiar to those skilled in the art. However, it is contemplated that the invention will operate with PDA devices using proprietary operating systems, so long as they are capable of wireless or wired communication. It is also contemplated that other types of portable computing devices that are or may become available could be used in this capacity. Accordingly, the term PCD ("portable computing device") will be used to describe the broad range of such types of devices, although PDAs are presently preferred and referred to herein for convenience of description.

As has been previously discussed, hardwired communications 710 and/or 730 can consist of an actual socket and plug interconnection between the two devices, or a barcode type reading arrangement. In particular, assuming for the moment that data compilation device 450 has at input port 312 (as discussed with regarding to FIG. A) which is a socket for receipt of a plug, such a plug could be located on activation device 600 or would be a telecommunications wire as is normally associated with computer component connections and/or telephone landline connections so that a socket would also exist on activation by 600 and a telecommunications wire (not shown) would extend between the socket of the data compilation device and the activation units. In such a situation, the socket ports would obviously need to be accessible to the field engineer, and socket 312 of data compilation device 450 would need to be reachable from an external portion of vending device 10. In the alternative, vending device 10 would need to be opened to access socket 312. In addition, assuming both activation device 600 and PDA 500 needed hardwired access to data compilation device 450, and such hardwiring was through a socket/plug arrangement, then as activation device 600's activation communication 710 with data compilation device 450 is different than PDA's 500 communication 730 with data compilation device 450, then since the type of communications between these devices are different, the ports would need to be different; i.e., in particular, activation device 600 communicates with data compilation device 450 so as to activate data compilation device 450. In this sense, the communication between these two devices is a type of sensor or sensing of data compilation device 450 so that it turns on from a dormant state. Such dormant state facilitating a power conservation for a power supply located within data compilation device 450. While PDA 500's communication with data compilation device 450 is significantly different, requiring the exchange of actual information between the two units. Accordingly, while the format and physical construction of the types of communications ports and connections can be similar, it is not believed that, as a practical matter, they would be the same precise ports and communications channels since different types of information are being transmitted.

The on/off activation of data compilation device 450 (from/to a dormant state) can be triggered as stated above through a socket/plug connection, a barcode reader connection and/or some type of infrared or other radiation signal transmission. If barcoding is used, the barcode that gives the signal for the activation will be the activation sensor and it can be on either the data compilation device or the activation device. Whichever device the barcoding is on, the other one of the two devices would have the barcode reading apparatus. In the case of the barcode reading apparatus being on data compilation device 450, a simple sensing of the barcode on activation device 600 by the barcode reader could activate the data compilation device 450. While the reverse of this barcode reading communication is possible, it is not preferred.

A radiation transmission type communication between data compilation device 450 and activation device 600 is easily achieved through the radiation beam being emitted from either one of the two devices with a sensor located on the other device to trigger the activation. Again, while the more common and preferable form would be for the radiation sensor to be located on the data compilation device and for the radiation beam transmitter to be on the activation device, the reverse is also possible.

In its normal state, data compilation device 450 is dormant. In such dormant state, the power source of data compilation device 450 is conserved as much as possible so that replacement is extended over as long a period as possible. In addition to extending the life of the power source, the power source is able to be a much smaller size. If, for example, data compilation device 450 had to regularly stay fully powered, then in order for it to last for a long period of time, the power source would need to be much larger. Therefore, shelf life of the power source for data compilation device 450 is extended and the size of the power source is able to be made smaller through use of activation device 600.

In addition to activation device 600 being useful in the power source requirements for data compilation device 450, activation device 600 is also a useful security mechanism for the entire system. In particular, it is possible that without activation device 600 any PDA 500 could activate data compilation device 450. While the data would presumably not be lost as stored in data compilation device 450, it certainly would be compromised and divulged to other users, and such users could be friendly or adversarial to the vendor/operator whose vending device 10 has data compilation device 450 installed therein. Accordingly, the purpose of activation device 600 is so that even PDA 500 that is meant to work with data compilation device 450 cannot so work unless data compilation device 450 is first "on" and such a condition cannot be reached until activation device 600 activates the same.

Another security mechanism of activation device 600 is for the supplier of information management system 400. As long as the system supplier hosts the database (on its server) on behalf of the system operator, it can monitor access by the operator (e.g. for fee purposes or license enforcement). However, should the system operator choose to host the database on its server, the supplier must have an access security device for controlling the operator's access to the system. This security device allows for limitation on the ability to use a PDA 500 in the system and/or to access data compilation device 450 with any PDA. For example, activation device 600 can be encoded with a term limitation for its ability to activate data compilation device 450. In particular, assuming a party a purchases a license to use information management system 400 for a limited period of two years, one way to insure that the two year period is strictly enforced and monitored is to set activation device 600 to no longer activate the activation sensor of data compilation device 450 after the two year period has expired. Such period sequencing could be achieved in activation device 600 by providing a timing mechanism in device 600 which runs for a set period of time after being activated. Such devices in software form well-known by those skilled in the art and are commonly applied to time-limit use of software. A timing mechanism could easily be programmed in firmware or providing in a hardware (circuit) form would be well within the knowledge of those skilled in the art. Upon renewal of the license the supplier of the system could wirelessly signal activation device 600 to reset its timing mechanism for a new term. Otherwise, the timed out device could be swapped out for a new one, provided by the supplier, with the same or a different time period built in.

Turning now to a discussion of communication 730 between PDA 500 and data compilation device 450. This type of communication is different than communication 710 between activation device 600 and data compilation device 450. The communication or connection 730 between PDA 500 and data compilation device 450, which communicates information and data relevant to vending device 10, is preferably through a conventional PDA socket which permits convenient plug-in and removal of the PDA. Alternatively connection 730 could be wireless (e.g. blue tooth, infrared, WIFI, radio frequency and cell telephone technologies). In particular, field engineers operating the system will be able to plug a PDA into the socket or connect wirelessly and input data and/or change data found in compilation device 450. If for example a vendor/operator determined that the gumballs that are found in vending device 10 are not a good seller, but that in other nearby locations toy racecars are selling better, the vendor/operator will want to replace the gumballs with such toy racecars. In this way, the information already located in data compilation device 450 will need to be modified, and the vendor/operator's field engineer would be able to do so with his/her PDA 500. At first, the field engineer might have to program the new data into his/her PDA and then he/she would plug in or wirelessly connect the PDA to the data compilation device, and download/transfer the new information. The means of connecting PDA 500 and data compilation device 450 have already been described and discussed, and include, but not limited to, hardwired socket and plug connections and/or barcode communications and/or wireless communications as have already been described herein.

As is known in the art, barcoding can be programmed so that the information contained in the barcode displaying device is changed. However, barcode reading is not a particularly convenient technology. Accordingly, it would be more advantageous to use RFID tags to implement more sophisticated features. Such tags can be interrogated wirelessly by an appropriate reader ("pulling" information), or they can be designed to broadcast information wirelessly to the reader ("pushing information). For example, an RFID tag could be located on the data compilation device 450 and controlled from within so that, for example, as more vends occur in formation in a signal provided by the tag changes. Alternately, the RFID signal could provide other codes, such as those indicating the need for maintenance, or that a machine has been compromised.

Figure 10:
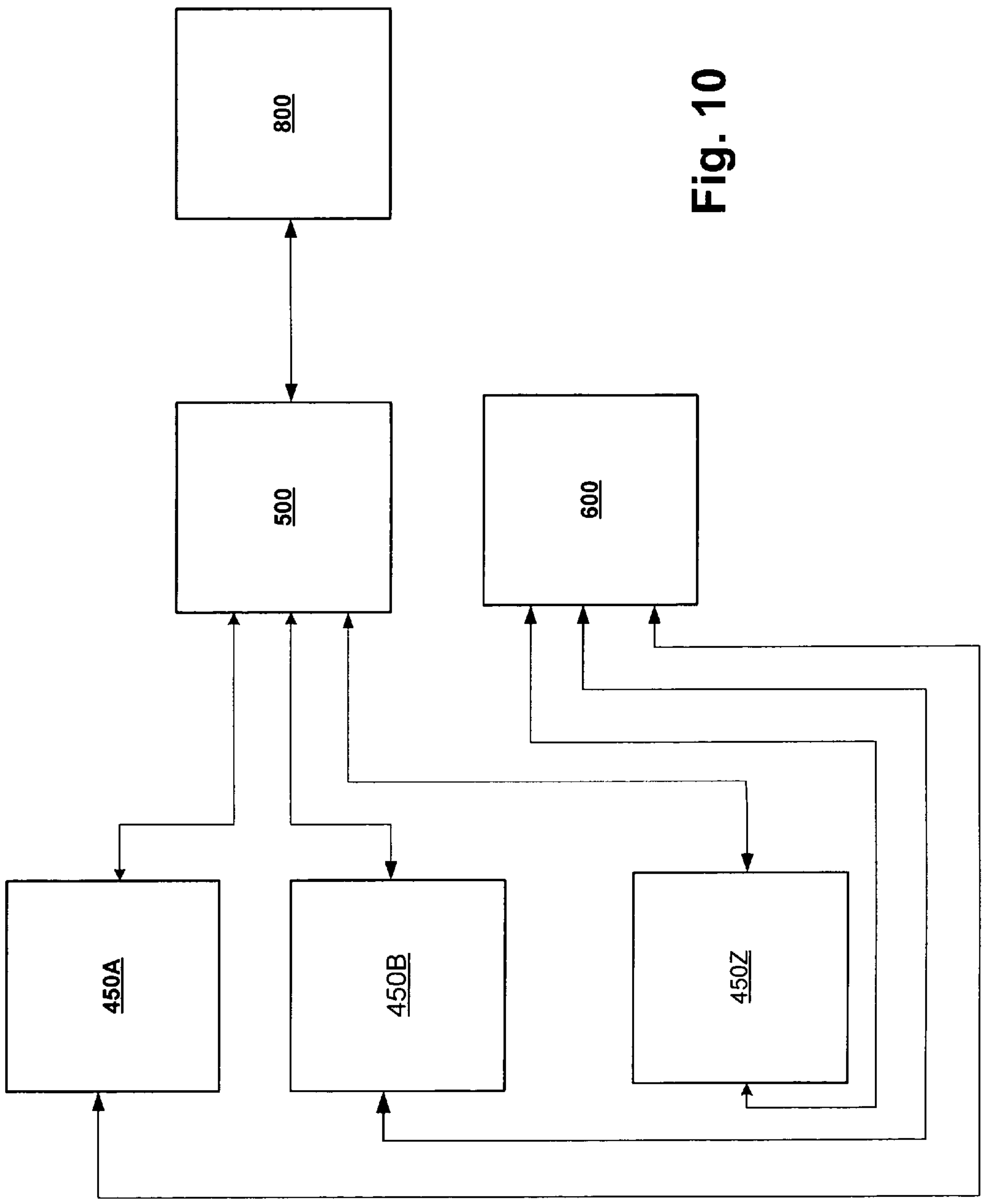
FIG. 10 is a block diagram of the system of the invention, including the remote server 800.

Turning now to FIG. 10, in normal practice, any given field engineer will have multiple vending devices 10 on any given route, each having a data compilation device 450A, 450B . . . 450Z. This field engineer would have a single activation device 600, and it would be programmed to communicate with all of the data compilation devices on his/her route. As he/she approached each vending device 10, activation device 600 would be brought into communication with data compilation device 450, thereby activating the same. Once the compilation device is activated, the engineer would determine whether there was any information to download from PDA 600 into data compilation device 450, and if so, such would be done. Then, a reading of the data compilation device would be taken and the information stored therein would be communicated to PDA 600; using one of the communications methods previously discussed herein. The engineer would then travel along the route to the next stop and next vending device 10 and perform the same steps. Alternatively, after each stop, or any combination of stops, the engineer could transmit the data in his/her PDA to central computer server 800 and/or download any new instructions or data for any given vending device 10. Of course, such communications assume in a preferred embodiment a wireless communication between PDA 500 and server 800, but a land-line connection is also contemplated.

Once loaded into server 800, the information from the engineer's route is compiled by software found in server 800. Such software parses the information into different hierarchal files for the different user profiles or the different people able to access the information on server 800. In particular, the anticipated user profiles are for the vendor/operator, the store/location, the OEM and the product supplier (if vending device 10 is a vending or a bulk vending machine). Preferably, The vendor/operator is subdivided into various user profiles, such as but not limited to, the regional manager, the account manager, the field engineer, the data entry person and the shop technician.

The vendor/operator is subdivided into various user profiles, such as but not limited to, the regional manager, the account manager, the field engineer, the data entry person and the shop technician.

Taking each one of these user profiles individually, one will note that the regional manager has access to system 400 so as to be able to conduct an overview of what other users are doing. The regional manager can control a tri-state area such as NYC, northern NJ and lower CT, or any other area covered under the vendor/operator's routes, even international routes. In order to monitor these complex routes properly, the regional manager will have access to all of the information for at least the routes under his/her control, including but not limited to, how each location is doing, the take on each location, the commissions that are being charged and how much product is being supplied. The regional manager will be able to view and manipulate reports on different levels of the operation he/she oversees, such as individual reports on his/her field engineers, account managers, other regional managers, the data entry personnel and the shop technicians, and these reports can also be demographically parsed. Examples of other reports are by product types (gumballs, stickers, etc.), location type (bars, barber shops, service stations, retail outlets, etc.), route type and locations, vending device type and/or make/model, and numerous other such reports. Therefore, by properly manipulating the information, a regional manager could actually study a report on whether, for example, how one-inch jawbreaker gumballs are doing in different areas of the country, or in one area of the country but in different types of stores; i.e., gumballs may sell better in machines in front of Target and like stores, then in bars.

Account managers will have similar information and reports available to them as the regional managers, but only for the accounts to which he/she is the manager; i.e., Wal-Mart, Stop n Shop, etc.

A field engineer can access server 800 via his/her PDA or over a desk top computer. He will have the ability to view his routes and locations to see their productivity and return, the schedules for his pickups of money and replenishing of product in machines and to generate service tickets for broken machines or ones that simply need maintenance. A service ticket is synchronized so that the main system creates an open service ticket for whomever is responsible for the service. Similarly, if a location owner calls to say that one of his vending devices has malfunctioned or does not work, he will be able to call in that he has a broken machine (i.e., machine 3 of the first stack of machines). A person at the vendor/operator responsible for answering calls would then enter this repair information into server 800 as a service ticket and when the field engineer synchronizes his PDA to system 400, the service ticket would appear and he would know the machine required service and would attend to such service (repair) on his next visit to that machine, or make a separate trip.

A vendor/operator data entry person could access server 800 via a desktop computer connection and would have the ability to enter information regarding new accountants. Such information would consist of, but not be limited to, all fields on an account setup form, such as name of customer, location(s), manager responsible, phone, fax, e-mail, a default location commission and a particular commission for each machine.

A shop technician builds the vending devices 10 for the various locations controlled by the vendor/operator. Such a technician would be told to fit data compilation devices 450 into "x" number of a certain type and specification of vending devices 10 for use at an existing or new location. Since each vending device 10 has different specifications, only select data compilation devices would fit these devices 10. Accordingly, the technician would access server 800 to determine what compatible data compilation devices are available for his use with the specified devices 10. In the alternative, the technician would simply be told that "x" number of devices 10 were needed for an existing or new location, without being told which type of devices 10 to use. In such a situation, the technician would need to access server 800 to determine both, what devices 10 where available and how many, and what devices 450 were available and how many. He would then pick the appropriate devices 450 and assign them to the chosen, compatible devices 10. He would then assign the chosen devices 10, with the compatible devices 450, to the location and log that information in server 800. In doing so, he would also download to a data storage chip of the data compilation devices 450, the location it was going to, the product to be dispensed from the device 10 it would be installed in, the coin value for a single vend from the machine, the commission to the particular machine (not to a particular location, as it is the product in the machine that dictates the commission, not necessarily the location (although this may happen also)), the device 10 number the device 450 is assigned to and the bar code number if bar coding is to be used.

For a store/location, while most of the same information would be available, as say for an account manager and/or possible even a regional manager, it would presumably be for the purpose of determining how each machine is performing; i.e., does the ride on elephant get more customers than the race car, or visa versa. Accordingly, it is similar to the vendor/operator side as far as seeing information such as the head of operations will see the whole picture of all their regional managers broken down to the account managers to store managers. There will be some data entry available for the store managers or owners, for example, or for the account manager on the store/outlet side, as these people will need to be able to change the name of the store manager or the contact, etc. Such users can also enter an internal account number for a particular store so that as the store gets receivables from the devices 10, the user can post same based on the particular store's or corporation's internal accounting system. Such a store/location can also bundle routes as it sees fit to get reports in these specified bundled groupings. For example, a vendor/operator might call its Route 1 certain locations, but the store/location (such as Blockbuster) might want to say that its Route 1 corresponds to its Store Nos. 101, 108 and 109, and this bundle would be different from how the vendor/operator bundled its locations into routes. In addition, certain special features will be available to the store/location, such as the ability to provide survey responses to the vendor/operator about its performance, and as has been previously stated, a store manager could have the ability to enter service tickets.

For the product supplier, the type of information that would interest them most is what categories of product are selling best and what the sales demographics for its products are. Hence, if for example the product supplier were an M&M candy supplier or distributor of M&Ms, they would want to know how M&Ms are doing in certain demographics, whether it be bars, Mom 'n Pop stores or major chain store outlets, such as but not limited to, Wal-Mart, K-Mart, Toys R Us, etc. so they can see how their products are moving and use that information for sales during the course of a year. The same goes for the OEMs. Here, they would want to know how their equipment was performing and/or holding up maintenance wise, which devices 10 were attracting the most business and what types of establishments were best suited for each type of device 10 they manufactured. All such information would be trackable to these organizations under the system 400 and within the server 800.

In addition to the above recited things the field engineer can accomplish using system 400 and server 800, he would also have the ability to run a complete route management system on his PDA. As he does his route and as he sees fit or the information given from the system requires, he can change product commissions and send that information on the fly to the particular data compilation device. He can do this by making the change to the data on the PDA and then activating the data compilation device using the activation device to complete the transfer.

Therefore, whether with or without approval, if the field engineer wanted to change a gumball machine to a peanut machine, he could empty out the gumballs and fill it up with peanuts and then he could program into his PDA that this machine (No. __________) is now a peanut machine and the commission is changed to __________ and the price is $__________ and the amount of peanuts that come out in each vend is "x" ounces and he can download all that information from his PDA into the date compilation device, which will then be automatically setup in the system to now give all the proper information. He would then also transmit the new data to server 800.

The system of the subject invention also allows for importation of information from even non-metered machines. For example, a location has 5 stores with a total of 100 machines, but none of the machines were ever equipped with a data compilation device. Nevertheless, since the machines are kept track of on paper and the money collected is counted and the amount of product refilled is also kept track of, the functionality of server 800 along with PDA 500 would allow for the entry of the information into the PDA by the field engineer, transmission to server 800 and then the above hierarchal manipulations. To make this even more functionally friendly, if the vending device is bar coded, where the bar code contains the information about the machine (location, number, product type, etc.), then either the activation device or the PDA can be provided as has already been discussed with a bar code reader, or even a separate bar code reader can be provided to the field engineer, so that all that remains is for the engineer to count the money and calculate the amount of product refilled into the machine for complete data to be provided to the system. Hence, a tremendous cost savings can be seen for those vendor/operators and/or stores/locations who can't afford to equip all of their existing vending devices with a data compilation device, while still being able to take advantage of the hierarchal accessibility and management of server 800.

For the prior art systems that use field engineers with PDAs, the extent of the programming on the PDA is purely the route for the day or the route for the next few days. There is no historical information stored on the PDA. It is purely here is the location I'm going to, here is the data entry form to fill in the appropriate fields, end of story.

Those skilled in the art will appreciate that other types of computers could be used instead of or in addition to a PDA. For example, a tablet computer, a laptop computer, or a sub-laptop computer could be used. A tablet computer has a touch sensitive screen and combines all the functionalities of the PDA and a desktop computer in one package. For a small operator, it could be possible to store the full database, eliminating the need for a separate server to store the database.

It should be appreciated that the present type of system could model each vend that occurs or each event that occurs on a vending piece of equipment and provide the date and time and store it in memory and collect that data and replace it in the database.

Desktop software is provided which a field engineer accesses in his office. It has an integrating mapping system which prints out his route for the day, week, month, etc., and it will download the maps to his PDA. The PDA has a commercially available GPS receiver attachment, which the field engineer can use with the downloaded maps out on the road if he gets lost, is in traffic or needs to otherwise move around into the system.

It will thus be seen that the objects set forth above, among those made apparent from the preceding description, are efficiently attained, and since certain changes may be made in the above constructions without departing from the spirit and scope of the invention, it is intended that all matter contained in the above description and shown in the accompanying drawings shall be interpreted as illustrative, and not in a limiting sense.

It is also to be understood that the following claims are intended to cover all of the generic and specific features of the invention herein described and all statements of the scope of the invention, which, as a matter of language, might be said to fall therebetween.

What is claimed:

1. A vending device information management method, comprising:

receiving from a vending device operator a request for activation of a vending device information management system;

triggering, in consequence of the request for activation, an activation device configured to awaken the vending device information management system from a dormant state;

wherein the vending device information management system comprises:

a data compilation device in proximity with a vending device, which is installed and fully operational regardless of the state of the vending device information management system, and configured to collect information particular to the vending device; and a connection for a portable computing device (PCD) constructed to permit the PCD to be used by a user of the data compilation device for receipt and manipulation of the information, inputting at least some of the information into the data compilation device, or both;

wherein the activation device is communicable with the data compilation device apart from the PCD.

2. The method of claim 1, wherein awakening the vending device information management system from a dormant state comprises preparing the data compilation device to export information therein to the PCD or to import information thereto from the PCD, the data compilation device being unprepared prior to awakening.

3. The method of claim 1, further comprising physically sending an activation device to the vending device operator.

4. The method of claim 1, wherein triggering an activation device configured to awaken a vending device information management system from a dormant state comprises remotely signaling an existing activation device to enable it to awaken a vending device information management system from a dormant state.

5. The method of claim 1, wherein the request for activation comprises purchase of a license.

6. The method of claim 1, wherein triggering an activation device comprises sending a remote radiation signal transmission directly to the data compilation device to activate it.

7. A method, comprising:

providing a vending device, the vending device comprising:

a data compilation device in a dormant state and configured to collect information particular to the vending device; and a connection for a portable computing device (PCD) constructed to permit the PCD to be used by a user of the data compilation device for receipt and manipulation of the information, inputting at least some of the information into the data compilation device, or both; and after the vending device is provided, triggering an activation device configured to awaken the vending device data compilation device from the dormant state;

wherein the vending device is fully operational for dispensing vends, regardless of the state of the data compilation device;

wherein the activation device is communicable with the data compilation device apart from the PCD.

8. The method of claim 7, further comprising physically sending the activation device.

9. The method of claim 7, wherein triggering an activation device configured to awaken the vending device information management system from the dormant state comprises remotely signaling an existing activation device to enable it to awaken the vending device information management system from the dormant state.

10. The method of claim 7, wherein triggering an activation device comprises sending a remote radiation signal transmission to activate the data compilation device.

11. A vending device information management system, comprising:

a data compilation device, in proximity to a vending device that is installed and fully operational regardless of a state of the data compilation device, in a dormant state and configured to collect information particular to the vending device;

a connection for a portable computing device (PCD) constructed to permit the PCD to be used by a user of the data compilation device for receipt and manipulation of the information, inputting at least some of the information into the data compilation device, or both; and an activation device communicable with the data compilation device apart from the PCD for awakening the data compilation device from the dormant state;

wherein the activation device is configured such that its ability to awaken the data compilation device from the dormant state is time-limited.

12. The system of claim 11, wherein the activation device comprises a timing mechanism and the ability of the activation device to awaken the data compilation device from the dormant state is limited to an active period of the timing mechanism.

13. The system of claim 12, wherein the timing mechanism runs for a set period of time after activation.

14. The system of claim 13, wherein the timing mechanism is configured to be reset after the set period of time expires.

15. The system of claim 14, wherein the vending device is under control of a first entity and the system is supplied by a second entity, and the timing mechanism is configured such that its resetting is out of the control of the first entity.

16. The system of claim 14, wherein the vending device is under control of a first entity and the system is supplied by a second entity, and the timing mechanism is configured to be reset by the second entity.

17. The system of claim 11, wherein awakening the data compilation device from the dormant state comprises preparing the data compilation device to export information therein to the PCD or to import information thereto from the PCD, the data compilation device being unprepared prior to awakening.

18. The system of claim 11, wherein the activation device is configured to awaken the data compilation device from the dormant state by sending a remote radiation signal transmission to the data compilation device.

* * * * *